Patented Jan. 22, 1946

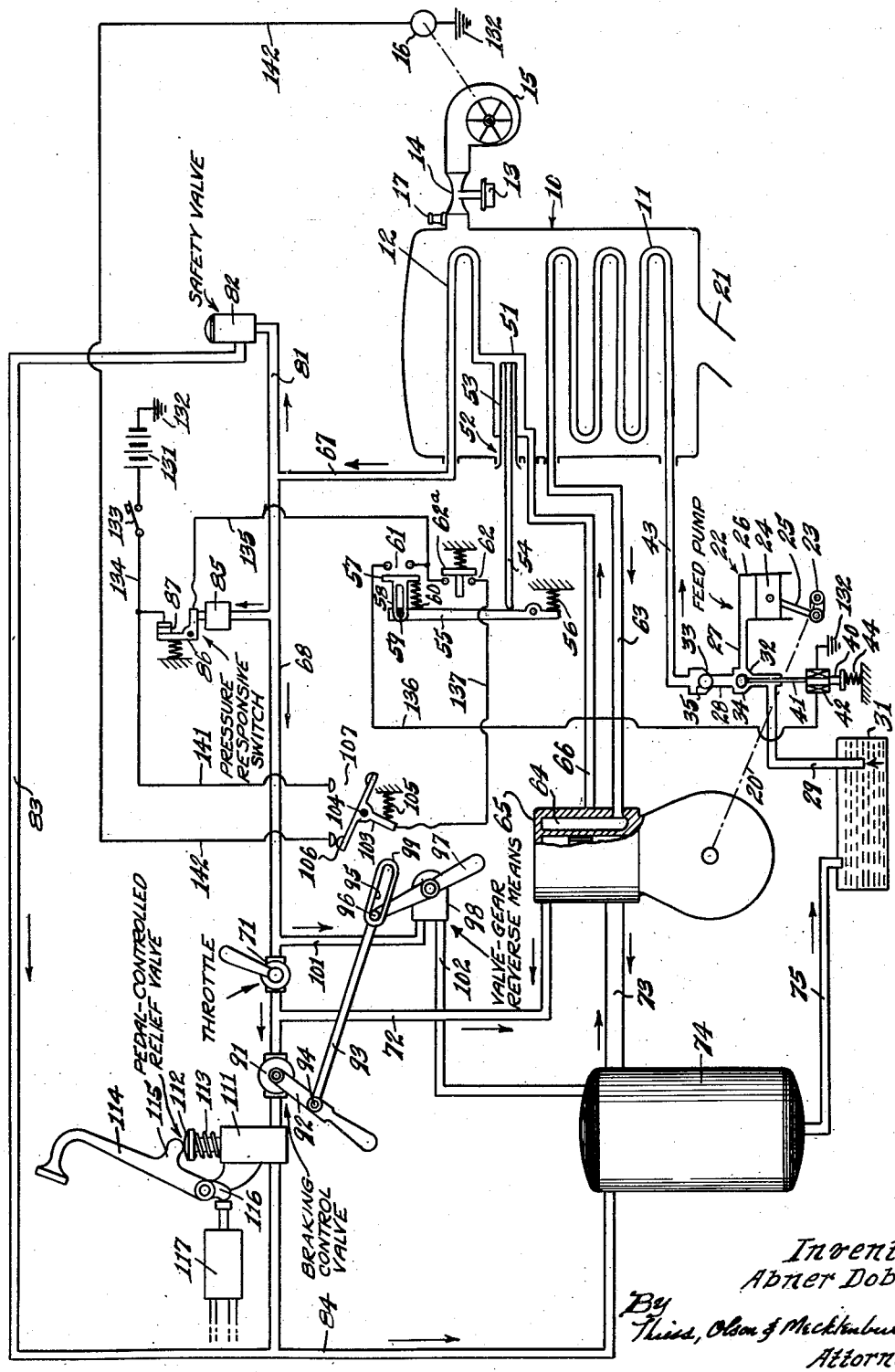

2,393,313

UNITED STATES PATENT OFFICE 2,393,313

STEAM POWER PLANT

Abner Doble, Chicago, Ill., assignor to Stanley Steam Motors Corporation, Chicago, Ill., a corporation of Delaware Application October 21, 1944, Serial No. 559,750

18 Claims. (Cl. 60—106)

This invention relates to power plants employing steam or other elastic fluids or vapors, and more particularly to steam power plants of small size but large capacity for installation in vehicles, for example, an automotive vehicle, and the invention has for an object the provision in a power plant of this character of means for performing the auxiliary function of utilizing fluid from the boiler at an intermediate stage of vapor generation for use in jackets of the engine as a cooling or heating medium depending upon the operating conditions of the engine; and as a further object to provide a plant capable of being used alternatively for propelling the vehicle or as a braking means.

In a power plant having small physical dimensions and large horsepower output it is desirable to use steam at high pressures and in a high range of superheat in order to derive the maximum useful energy from the fuel used for heating the boiler. For example, by using materials now available for the construction of the parts subjected to these high pressures and temperatures it is possible to operate a power plant of the character described with steam at a pressure as high as 2000 pounds per square inch and having a total temperature, including superheat, of 1200° F. or more. However, when operating with steam at such temperatures great difficulty is encountered with lubrication of the valves and pistons. It is of course necessary that the lubricant used remain at the proper viscosity and chemical state, regardless of the temperature of the steam being circulated in the engine. Accordingly, there have been suggested in the prior art various means of maintaining the walls of the cylinder, cylinder heads and piston at a temperature low enough for proper lubrication to counteract the destructive effect thereon of the high temperature of the steam. Such prior structures have included the use of water or other fluids circulated about the engine parts, or the passage of water from the boiler at some stage in its transition from water to steam and recirculating that water or steam back to the boiler. In the latter arrangement no means was provided to coordinate the temperature of the water to be circulated with the operating demands of the engine, or no region specified in the boiler wherefrom the water should be drawn or whereto it should be returned. Accordingly, a further object of the invention is the provision of means for cooling those moving parts of the engine whose lubrication may be impaired by steam at high temperatures.

In power plants of the general type mentioned, i. e., for use in vehicles, it is highly desirable to utilize the pistons and cylinders of the engine in a reverse manner to render them active as a compressor mechanism, whereby the resistance of the steam to a force applied to the piston is effective as braking means to decelerate the motion of the vehicle. The desirability of this feature becomes evident when the momentum of a large vehicle such as a bus or truck must be absorbed to reduce the speed thereof on a grade, or to bring the vehicle to rest. By driving the engine from the wheels through the transmission and clutch a most effective braking means is provided, and wear on the brake linings of the wheels or drive shaft is materially reduced. The compression of the steam results in the production of a large amount of heat and the water jacket is utilized to dissipate this heat. Hence a further object is the provision of an efficient braking system together with means adapted to convert rapidly the propelling engine to a braking mechanism.

In carrying out the invention in one form, a power plant is provided comprising an engine and a boiler including two sets of coils. Fluid enters one set of coils and flows therethrough until it attains a temperature suitable for use in cooling the lubricated areas, wherefrom it is circulated through the jackets provided in the engine therefor and, after performing its function returned to the other set of coils and heating thereof continued to produce vapor for feeding the engine.

In connection with a power plant embodying a multiple-expansion engine, e. g., having a high-pressure stage, an intermediate-pressure stage, and a low-pressure stage, another object resides in using the fluid from the boiler not only to create the best condition for lubrication, but to maintain the walls of the low-pressure cylinder at a temperature considerably higher than the saturation-temperature corresponding to the pressure of the steam employed in that cylinder, thereby preventing undue loss of efficiency by condensation of the steam in the cylinder, and resulting in a feature of decided advantage when operating at light loads.

In a power plant operating on steam at 1500 pounds per square inch, for example, the water in the boiler would boil at approximately 600° F., and the heat content of water at that temperature would be effective for the purposes above outlined. In certain types of installations, in order to attain a proper cooling effect it may be found more desirable to draw the water to be circulated from the economizer-zone of the boiler at a temperature lower than that of evaporation.

A further object gained by circulating water from a selected zone of the boiler is the safeguarding of the material from which the cylinders, valve housings, and other parts in contact with the incoming steam are constructed, from the injurious effects of high temperature. Furthermore, by maintaining a well-heated engine during idling or before starting, the engine is allowed to operate at high efficiency and with high starting torque.

In carrying out the invention in its other aspect of employing the engine as a braking means, the valve-gear is so proportioned as to yield inlet and delivery timing of the valves for smooth compression and the elimination of uneven torque. By suitable mechanism to be described hereinafter, the engine may be instantaneously converted from propelling action to braking action so that the pistons and cylinders serve as a compressor, drawing steam from the condenser and compressing the same to generate heat which heat is transferred to the jacket-water and thus to the boiler, which results in the formation of steam and an increase in boiler-pressure. Excess pressure so created is relieved through a suitable valve to the condenser, and therefrom to the hot well. During the braking periods, no steam reaches the condenser from the engine, so that the condenser is of ample capacity to accommodate the excess steam engendered by the braking action.

Inasmuch as this method of braking, which is operative only when the valve-gear is in "reverse" position, requires a control to permit the boiler feed-pump to furnish feed-water to the boiler, under control of the boiler thermostat, it is an additional object to provide means for continuing the feed-pump in operation under control of the boiler thermostat whenever the engine is functioning as a braking means. When the engine acts to propel, the varying demand for steam thereby serves through a pressure-operated control in combination with the thermostat to start and stop flow of feed-water through the pump. Therefore, when the engine acts as a brake, means are provided to transfer the control of the feed-pump from the pressure-control and boiler-thermostat jointly to the boiler-thermostat solely.

For a more complete understanding of the invention, reference should now be had to the drawing in which the invention is illustrated diagrammatically as embodied in a power plant, comprising a steam generator or boiler 10 which incorporates two sets of coils 11 and 12. In coil 11 the water circulates and is raised from feed-water temperature to that temperature desired to effect the objects aforementioned, and in coil 12 the water circulated through the engine is heated further to form superheated steam for driving the pistons. Although for clarity schematic coils are shown, it will be understood that there is actually a bank of boiler tubes or coils of any of several well-known constructions.

Heating of the boiler is accomplished by means of any suitable fuel and burner, and by way of illustration there is shown a carburetor 13 feeding fuel to a Venturi tube 14 through which air for combustion is forced by a blower 15 driven by an electric motor 16. A spark plug 17 ignites the fuel and air mixture. Products of combustion pass from the boiler through an exhaust 21.

For supplying water to the boiler there is provided a feed-pump 22 comprising a crank-shaft 23 driven from the main shaft 20 of the engine and reciprocating a piston 24 through a connecting rod 25. By means of pipe 27 the cylinder 26 is in communication with the valve chamber 28. The latter connects with a pipe 29 extending from the water in the hot-well 31. The valve chamber 28 includes the inlet port 32 and the outlet port 33 adapted to be closed by valves 34 and 35 respectively. Adapted to actuate the valve 34 is the push rod 41 forming an extension of the armature 40 of a solenoid 42. A spring 44 constantly urges the armature 40 and its push rod 41 upwardly. The chamber 28 is in communication with the boiler coil 11 through conduit 43.

Arranged within a suitable pocket 51 of the coil 12 and in a zone corresponding to the boiling point of the water in the boiler under all conditions of boiler-load, is the thermostat 52 comprising an elongated sleeve 53 of relatively small diameter compared to its length, and consisting of metal which changes rapidly in dimensions under varying temperatures, closed at the inner end and having attached thereto a control rod 54. The outer extremity of the rod 54 is adapted to operate a pivoted lever 55 and a spring 56 biases the lever into operative contact with the rod 54.

The lever 55 operates two sets of electrical contacts shown at 61 and 62, those at 61 being open when rod 54 is to the left corresponding to a low-temperature condition of the thermostat 52 and those at 62 being at that time closed. Contacts 61 are closed by a movable member 57 having a slotted aperture 58 engaging a pin 59 and having interposed between it and the lever 55 the spring 60, so that member 57 which is disengaged from the contacts 61 when the lever 55 is to the left, will move to close the contacts 61 when the lever 55 moves to the right, and after the contacts 61 are closed the spring 60 yields to permit additional movement of the lever 55 to the right so as to operate the member 62a to open the contacts 62. Upon leaving the coil 11 the boiling water passes through a conduit 63 to the jackets 64 of the engine 65. For clarity, only one cylinder and its jacket are shown, but it will be understood that the water may be circulated through all jackets of the engine, regardless of the number of cylinders or their construction, and furthermore, by suitable means, not shown, the water may be circulated through the piston rods and pistons. It will be understood that instead of double walls as shown, to form the jackets, there may be provided tubing wound or otherwise shaped to follow the contours of the engine parts and cast integrally with the parts themselves, e. g., a helically-wound tube could be cast around the cylinder. After performing its function of heating or cooling, as the case may be, in the engine, the water is returned through conduit 66 to the coil 12 wherein it is transformed into steam or superheated if already in the form of steam, and fed through branch 67 to the steam main 68.

Admission of steam to the engine is by a throttle 71 and branch 72, and exhaust thereof from the engine is through conduit 73 to the condenser 74. Condensation is returned to the hot well 31 by a conduit 75.

Connected to the main 68 by a branch 81 is the safety valve 82 by means of which any excessive pressure in the steam feed system is relieved to pass through the conduits 83 and 84 to the condenser 74. Also connected to the main 68 is the pressure switch 85 actuable by steam pressure to operate a lever 86 carrying one of a pair of contacts 87, the other being fixed.

Steam main 68 is also provided with a braking-control valve 91 including a handle 92 carrying a link 93 pivoted thereto at one end at 94. The link 93 is extended at its opposite end into a yoke including an elongated aperture 95 with which engages a stud 96 carried on one end of the handle 97 adapted to operate the "forward-reverse" valve 98. Movement of the handle 97 effects operation of the valve-gear of the engine for manipulating the same into position for "forward" or "reverse" propelling action. Since the valve-gear may be of any preferred type and the invention is applicable to an engine having any type of valve-gear, the same is not illustrated or further described.

Adapted to be actuated by the extremity 99 of the link 93 is the bell crank lever 103 pivoted at 104 and normally biased clockwise as shown by a spring 105. At each end of the transverse arms of the lever 103 are the movable members of the pairs of contacts 106 and 107 for a purpose to be described.

Interposed in the main 68 is the pedal-controlled relief valve 111 provided with a member 112 seating against the spring 113. Valve 111 may be of several different constructions, as for example, including a valve seat and disc pressed thereagainst by the spring 113, the pressure of said spring being relatively light for a purpose to be explained, but adapted to be compressed further by pressure applied to the pedal 114. Although for convenience I describe the valve 111 as "pedal-controlled" it will be understood that I comprehend thereby any valve under the control of the operator of the vehicle, and therefore, that when used in the description and claims, the phrase "pedal-controlled" is to be given that meaning. Discharge through the valve 111 is through the conduit 84 to the condenser 74. A brake pedal 114 provided with a projection 115 for engaging the member 112 serves to control the valve 111. Another extension 116 on the pedal 114 may operate the air or hydraulic brakes of the vehicle by actuation of the usual valve 117, the same being adapted to be used independently of and alternatively with the engine-braking means.

The electrical system is as follows: A battery 131 is connected at one terminal to ground 132 and at the other to a master cut-off switch 133. A conductor 134 connects to the fixed member of contacts 87, and a conductor 135 connects the lever 86 carrying the other of the contacts 87 to one of each of the contacts 61 and 62. The remaining one of contacts 61 is connected by a conductor 136 to one terminal of the solenoid 42, the other terminal being connected to ground 132. The remaining one of contacts 62 is connected by a conductor 137 to the lever 103. A conductor 141, together with conductor 134, serves to connect the fixed member of contacts 107 to the battery 131. The motor 16 is connected by one terminal to ground 132 and by the other through conductor 142 to the fixed member of contacts 106.

Assuming that the boiler 10 is operating during either propelling or braking and is demanding water, the feed pump 22 will be supplying water to the coil 11. During this period the solenoid 42 is energized, since the thermostat 52 is expanded, rod 54 is to the right, and contacts 61 are closed to form a circuit including ground 132, battery 131, closed switch 133, conductor 134, closed contacts 87, conductor 135, closed contacts 61, conductor 136, solenoid 42 to ground 132. Hence, rod 41 assumes its lower position against the spring 44 to permit the valve 34 to occupy its port 32. Now the pump will operate normally, suction occurring through the valve 34, and discharge through the valve 35 and conduit 43 to the coil 11.

Simultaneously a circuit exists for blower motor 16, the same being traced from ground 132, conductor 142, closed contacts 106, lever 103, conductor 137, closed contacts 62, conductor 135, closed contacts 87, conductor 134, switch 133, and battery 131 to ground 132, so that the fuel mixture is being supplied to the boiler, ignition having taken place through the agency of spark plug 17 controlled in any convenient manner.

Boiling water will be generated and discharged from coil 11, through conduit 63, through the jackets of the engine in series and/or parallel and out through the conduit 66 to the coil 12. The proportioning of the number and size of the coils 11 and 12 is selected so that water will preferably be extracted from the boiler at a temperature corresponding to the boiling point at the pressure existing in the boiler under all conditions of boiler-load, i. e., near the beginning of the evaporation zone.

After its circulation through the jackets 64 the water, or under some conditions water and/or steam, is returned to the coil 12 where its conversion into steam and superheating to the desired degree is completed, and the same fed to the main 68 by way of conduit 67. Steam is admitted to the engine by means of throttle 71 and branch 72, exhaust occurring through conduit 73 to the condenser 74.

For regulation of the pressure of the steam being delivered to the engine, and hence of the temperature of the boiling water being circulated through the jackets 64, the thermostat 52 is employed. As the temperature of the steam and/or water existing in the pocket 51 rises, the sleeve 53 expands in length to move the rod 54 to the right and permit the lever 55 to swing clockwise under urging of the spring 56.

When the supply of feed water to the boiler is sufficient to cause the boiler temperature to decrease, the thermostat 52 will contract so that lever 55 moves counterclockwise and opens contacts 61. Thus the circuit to solenoid 42 is interrupted and the spring 44 operates to raise the rod 41 and thereby lift valve 34 from its seat. Accordingly pump 22 is ineffective to feed water to the boiler since the pump will merely draw water through the port 32 and discharge through the same to the well 31, and none will pass through the valve 35 which is maintained closed by pressure in the boiler.

As the steam pressure (temperature) falls upon consumption thereof, the thermostat 52 contracts to permit contacts 62 to re-close and return the motor 16 and blower 15 to active duty. The resulting increased rate of evaporation within the boiler causes a rise in boiler temperature and dictates a restoration of feed of water to the boiler. Accordingly thermostat 53 expands to permit contacts 61 to be closed by member 57 to energize the solenoid 42 and thereby reestablish flow of boiler feed water through the valve 35 to make up for the increased rate of evaporation within the boiler. Further movement of the rod 54 to the right will move member 62a to open contacts 62 to de-energize the circuit heretofore traced for the motor 16, and the fuel mixture is cut off.

It will be noted that the pressure switch 85 comprising the contacts 87 will operate under excessive pressure in the main 68, so if that event occurs contacts 87 will open to break the circuit for both the motor 16 and the solenoid 42, and permit the pressure to drop, whereupon the circuit is re-established.

By interposing the thermostat 52 in the coil 12 at a position corresponding to the return of the water from the jackets 64, it is possible to secure control of the jacket temperature in proportion to the quantity of heat required by the jackets. For example, if at starting or upon operation at light loads, the jackets require more heat due to the cooling effected by the low pressure steam used at light loads or the drop in pressure incident upon starting, the circulating water is thus cooled to a greater extent, and the thermostat acts to raise the boiler temperature to the level necessary to supply that additional heat. Thus the engine is enabled to operate powerfully and economically as soon as it is started and reduces to a negligible degree any risk of damage due to water in the cylinder. In large cylinders the likelihood of cracking of the cylinder-casting by uneven expansion of the metal is materially reduced.

Inasmuch as the thermostat acts to maintain constant the temperature of the steam delivered by the boiler, another valuable result is secured; viz., assuming that the engine has been operating under a light load with short cut-off. Under that condition the cylinder-walls will require more heat than when operating under a heavy load and this heat must be taken from the water in the jackets in order to produce a balance between the temperatures of the water and steam. Such heat must be supplied by the boiling water and accordingly more heat must be applied to the boiler to raise the temperature of the water therein. Decrease of the temperature of the water in the boiler results in a lowered rate of generation of steam. To re-establish the required rate of steam flow to the cylinder to compensate for the increased condensation at light load, the drop in pressure (temperature) in coil 12 and thermostat 52 will reclose the contacts 62 and start the blower 15 to increase the temperature of the steam being supplied by the boiler. When proper equilibrium has been reached between the steam in the cylinder and the water in the jackets the thermostat will reverse its action. Thus constant regulation as just outlined will occur.

Now, assume the throttle 71 suddenly to be opened wide. Less heat is required by the jackets, or stated otherwise, a new condition of balance must be reached between the water and steam, the jacket water tending to be raised to the temperature of the steam in the cylinder, and that steam tending to approach in temperature that of the water. Increased flow of steam from the boiler results in correspondingly increased flow of water through the jackets, for, in reality, coils 11 anad 12 are in series, the jackets being intermediate the series. At this stage the jackets accept less heat since their temperature has been increased suddenly relative to the temperature of the water in the jackets. However, the increased flow of steam from the boiler has decreased the pressure therein, which lowers the temperature at which water will boil in the boiler. These effects permit the water to leave the jackets at a higher temperature to operate the thermostat and increase the flow of feed water to accommodate the increased demand on the engine.

After full load has prevailed for some period of time, suppose the throttle 71 be partially closed to, say, one-quarter full load. Pressure drop through the boiler is not as great, and the pressure therein increases to cause the water to approach a higher boiling point. Simultaneously the cylinder-walls require more heat to balance the lowered steam pressure, and therefore the jackets yield more heat. Hence the water reaching the thermostat is cooler and it reacts to reduce the quantity of feed water and boiler heating.

For reversing the engine there is provided the handle 97 controlling the valve 98 to admit live steam through the branch 101 to operate the valve gear of the engine, steam being exhausted through the conduit 102 to the condenser. Although any suitable mechanism manually or power-operated, for actuating the valve gear from "forward" to "reverse" or vice versa in accordance with the movements of the lever 97, may be employed, a preferred form of reversing mechanism is described and claimed in my copending application Ser. No. 518,517, filed on January 17, 1944. In the position shown in the drawing the handle 97 is in "forward," and upon being swung clockwise it would be in "reverse." For convenience the handle 97 will be hereinafter referred to as the "forward-reverse" control.

The valve 91 will be referred to as the "braking-control" and its function will now be described. In the position shown for the braking-control 91 the engine is in normal propelling operation and braking is effected by use of the pedal 114 operating through the valve 117, the usual air or hydraulic brakes being employed. Under that condition the braking-control 91 is closed and no steam from the main 68 may pass therethrough to the valve 111. However, if it is desired to use the engine in its braking function, the handle 92 is moved to the right to actuate the link 93. This in turn rotates the forward-reverse handle 97 clockwise through stud 96 whereupon the braking control valve 91 is opened to permit exhaust steam from the engine to pass through the valve 111. Simultaneously the valve 98 is operated to permit live steam to actuate the valve-gear to "reverse," exhaust from the operating cylinder passing through the conduit 102 to the condenser 74. Admission of steam to the valve 111 and shifting of the valve-gear to reverse, conditions the brake pedal 114 and the valve gear for "engine-braking." The pressure of the spring 112 is such that notwithstanding there may be no actuation of the pedal 114 by the operator, throttling of the exhaust steam through the valve 111 exerts a back-pressure on the piston and results in braking of the vehicle by the engine. However, if additional braking force is required the operator presses the pedal 114 to increase the force of the spring 113 to produce a greater back-pressure. The extremity 99 of the link 93, upon movement thereof, strikes the downwardly extending arm of the lever 103 to open contacts 106 and to close contacts 107.

Inasmuch as during braking action the engine remains connected in propelling relation with the wheels of the vehicle, the momentum of the vehicle is, during such action, imparted through the wheels to the engine, so that the engine is over-driven.

Since during braking there is no need for generation of steam, the opening of contacts 106 cuts off the blower motor 16, the circuit therefor having previously been traced as including the contacts 106. Due to reversal of the valve gear and the braking action of the engine to be described more fully hereinafter, the steam pressure will rise in the main 68 to operate the control 85 and rock the lever 86 counterclockwise to open the contacts 87. Thus the circuit from the battery 131 to the solenoid 42 will be interrupted regardless of whether the contacts 61 are open or closed under control of the thermostat 52. Accordingly it is necessary to set up an alternative circuit for the feed pump 22, which may be traced from battery 131, through conductor 134, conductor 141, closed contacts 107, conductor 137, contacts 62, contacts 61, conductor 136, solenoid 42 to ground 132. However, thermostat 52 still retains its control as heretofore set out.

With the valve gear in "reverse" the heat generated by the compression of the steam within the cylinder is transferred to the jackets, thereby increasing the heat content thereof, so that when that water returns to the boiler there results increased formation of steam and an increase in boiler-pressure. Relief thereof occurs through branches 67, 81, safety valve 82, exhaust lines 83 to 84 to the condenser 74. It will be understood that, during braking periods, no steam reaches the condenser from the engine, so that the condenser capacity is not overtaxed by relief through the valve 82.

However, it is essential that the feed pump be maintained in operation during engine-braking, since the heat supplied to the boiler 10 will generate additional steam therein, and feed-water must be supplied, otherwise the steam being generated may reduce the quantity of water in the boiler to a dangerous level. The circuit for the feed pump has just been traced.

Referring again to the braking control 91, it will be noted that when engine-braking is not desired the link 93 is to the left, but in virtue of the slot 95, the "forward-reverse" lever 97 may nevertheless be operated to either of its positions without disturbing the link 93.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In a power plant including a generator for supplying vapor to a vapor engine, the combination comprising a first set of passages in the generator, a second set of passages in the generator, means for supplying fluid to said first set of passages, chambers in the engine adjacent those lubricated parts thereof subjected to the heating effect of the vapor supplied to the engine, a conduit between the outlet from said first set of passages and said chambers, a conduit between the said chambers and the inlet to said second set of passages, temperature-responsive means adjacent the inlet to said second set of passages and in heat-exchanging relation with the medium therein, a conduit between the outlet from said second set of passages and the vapor chest of the engine, and means under the control of said temperature-responsive means for controlling said first-mentioned means.

2. In combination, a steam engine including a cylinder, means forming a jacket for said cylinder, steam-generating means including a boiler for supplying superheated steam to said cylinder, inlet and outlet means connecting said jacket to the boiling zone in said boiler whereby boiling water flows from said boiling zone through said jacket in heat-exchanging relation with the walls of said cylinder and returns to said boiling zone, and thermostatic means responsive to the temperature of the boiling water returning from said jacket for controlling said boiler.

3. In a power plant including a generator for supplying superheated vapor to a vapor engine, the combination comprising a first set of coils in the generator in which fluid may be brought to the boiling point, a set of superheating coils in the generator, means for supplying fluid to said first set of coils, means forming a jacket for parts of the engine subject to contact by the active vapor therein, a conduit between the boiling zone of said first set of coils and the jacket and a conduit between the jacket and said superheating coils whereby boiling fluid may be circulated through said jacket and returned to the superheating coils, a conduit between the outlet of said superheating coils and the vapor chest of the engine, temperature-responsive means adjacent the inlet to said superheating coils and in heat-exchanging relation with the vapor therein, and means under the control of said temperature-responsive means for controlling said first-mentioned means.

4. In a power plant including a boiler for supplying superheated steam to a steam engine, the combination comprising a first set of coils in the boiler in which water may be brought to the boiling point, a set of superheating coils in the boiler, means for supplying water to said first set of coils, means forming a jacket for parts of the engine subject to contact by the active steam therein, a conduit between the boiling zone of said first set of coils and the jacket and a conduit between the jacket and said superheating coils whereby boiling water may be circulated through said jacket and returned to the superheating coils, a conduit between the outlet of said superheating coils and the steam chest of the engine, temperature-responsive means adjacent the inlet to said superheating coils and in heat-exchanging relation with the steam therein, and means under the control of said temperature-responsive means for controlling said first-mentioned means.

5. In a power plant including a boiler for supplying superheated steam to a steam engine, the combination comprising a first set of coils in the boiler in which water may be brought to the boiling point, a set of superheating coils in the boiler, means including a pump for injecting water into said first set of coils, means forming a jacket for parts of the engine subject to contact by the active steam therein, conduits adapted to connect said two sets of coils and said jacket for series flow therethrough, the jacket being intermediate said sets of coils, a conduit connecting the outlet of the superheating coils to the steam chest of the engine, temperature-responsive means adjacent the inlet to said superheating coils and in heat-exchanging relation with the steam therein, and means under the control of said temperature-responsive means and operatively connected with said first-mentioned means to initiate and terminate operation of said pump.

6. In a power plant including a boiler for supplying superheated steam to a steam engine, the combination comprising a first set of coils in the boiler in which water may be brought to the boiling point, a set of superheating coils in the boiler, means including a continuously-operating pump for injecting water into said first set of coils, a valve mechanism for said pump, electrically controlled means associated with said valve mechanism to initiate or terminate flow of water from said pump, means forming a jacket for parts of the engine subject to contact by the active steam therein, conduits adapted to connect said two sets of coils and said jacket for series flow therethrough, the jacket being intermediate said sets of coils, a conduit connecting the outlet of the superheating coils to the steam chest of the engine, temperature-responsive means adjacent the inlet to said superheating coils and in heat-exchanging relation with the steam therein, and means under the control of said temperture-responsive means and connected with said electrically-controlled means.

7. In a power plant including a boiler for supplying superheated steam to a steam engine the combination comprising a water-heating section and a superheating section in said boiler, means forming a jacket for those lubricated parts of the engine subject to contact by the active steam, said sections and jacket adapted to be connected in series with the jacket intermediate said sections, a continuously-operating pump for injecting water into said heating section, a valve mechanism for said pump, electrically-controlled means including a solenoid for actuating said valve mechanism to initiate and terminate flow of water from said pump, a connection from the outlet of the superheating section to the steam chest of the engine, temperature-responsive means adjacent the inlet to said superheating section and including a switch, a source of electric current, an electrical circuit including said source, switch and solenoid whereby delivery of water from said pump is under the control of the temperature of the steam in said superheating section.

8. In a power plant including a boiler for supplying superheated steam to a steam engine the combination comprising a water-heating section and a superheating section in said boiler, means forming a jacket for parts of the engine subject to contact by the active steam, said sections and jacket adapted to be connected in series with the jacket intermediate said sections, a burner for heating said boiler including a fuel-feeding means, a pump for injecting water into said heating section and including valve means for initiating and terminating flow of water from said pump, a connection from the outlet of the superheating section to the steam chest of the engine, temperature-responsive means adjacent the inlet to said superheating section and operatively connected to said fuel-feeding means and said valve means whereby control of feed-water for the boiler and heating thereof is under the control of said temperature-responsive means.

9. In a power plant including a boiler for supplying superheated steam to a steam engine the combination comprising a water-heating section and a superheating section in said boiler, means forming a jacket for those lubricated parts of the engine subject to contact by the active steam, said sections and jacket adapted to be connected in series with the jacket intermediate said sections, a burner for heating said boiler including a fuel-feeding means, a pump for injecting water into said heating section and including electrically-controlled valve means for initiating and terminating flow of water from said pump, a connection from the outlet of the superheating section to the steam chest of the engine, said connection being provided with a device responsive to steam pressure, an electrical switch under the control of said device, temperature-responsive means adjacent the inlet to said superheating section and operatively connected to a second electrical switch, a source of electric current, and an electrical circuit including said source and said switches whereby the control of the fuel-feeding means and the pump is under the joint control of said device and said temperature-responsive means.

10. In a power plant for use in traction and for braking including a steam engine having a piston and a cylinder; a steam generator for supplying steam to the cylinder; means forming a jacket for said cylinder and adapted for circulation of water in said jacket in heat-exchanging relation with the steam in the cylinder; a throttle valve for regulating flow of steam to the cylinder for traction; means for reversing the flow of steam to and from the cylinder for forward or reverse traction; a braking control valve; and means operatively interconnecting said reversing means and said braking control valve; whereby, upon closure of said throttle valve and actuation of said braking control valve for braking, flow of steam to the cylinder is reversed and the engine over-driven to yield a braking action.

11. In a power plant for use in traction and for braking including a steam engine having a piston and a cylinder; a steam generator; a heating section and a superheating section in said generator; means forming a jacket for said cylinder; said jacket being in series fluid communication with said sections and intermediate said sections, and the water in said jacket being adapted for heat-exchange with the steam in the cylinder; means for reversing the flow of steam to and from the cylinder for forward or reverse traction; a throttle valve for regulating flow of steam to the cylinder for traction; a braking-control valve; and means operatively interconnecting said reversing means and said braking-control valve; whereby upon closure of said throttle valve and actuation of said braking-control valve the engine is over-driven to yield a braking action and the heat of compression of the over-driven engine is transferred to the jacket.

12. In a power plant for use in traction and for braking including a steam engine having a piston and a cylinder; a steam generator; means forming a jacket for said cylinder and adapted for circulation of water in said jacket in heat-exchanging relation with the steam in the cylinder; a throttle valve for controlling flow of steam to the cylinder for forward or reverse traction; a braking-control valve; valve-gear associated with the engine for controlling flow of steam to the cylinder and adapted to be actuated for forward or reverse traction; means interconnecting said braking-control valve and said valve-gear; said last mentioned means being adapted to permit actuation of said valve-gear by said braking-control valve, and to permit free actuation of said valve-gear when said braking-control valve is in non-braking position; whereby upon actuation of said braking-control valve said valve-gear is actuated for reverse traction and the engine over-driven to yield a braking action, the heat of compression of the over-driven engine being transferred to the water in the jacket.

13. A power plant for a vehicle adapted for propelling or braking action and having a steam engine including a cylinder and piston; comprising a jacket for the cylinder adapted to receive a fluid; said fluid being adapted for heat-exchanging relation with the steam in the cylinder; a throttle valve for regulating flow of steam to the engine for traction; a braking-control valve; valve-gear associated with the engine for controlling flow of steam to and from the cylinder and adapted to be actuated for forward or reverse propelling action of the engine, means operatively interconnecting said valve-gear and said braking-control valve to actuate said valve-gear for reverse action; whereby upon closure of said throttle valve and actuation of said braking-control valve the engine is over-driven to yield a braking action and the heat of compression of the over-driven engine is transferred to the fluid.

14. A power plant for a vehicle adapted for propelling or braking action including a steam engine having a cylinder and a piston; comprising a jacket for the cylinder adapted to receive a fluid; said fluid being adapted for heat-exchanging relation with the steam in the cylinder; a throttle valve for regulating flow of steam to the engine during propulsion; a pedal-controlled relief valve; valve-gear associated with the cylinder for controlling the admission of steam thereto and the exhaust of steam therefrom and adapted to be actuated for forward or reverse propulsion, a braking-control valve, a duct connecting said cylinder with said braking-control valve and a second duct connecting said braking-control valve with said relief valve, means operatively connecting said valve-gear with said braking-control valve, whereby upon actuation of said braking-control valve said valve-gear is conditioned for reverse propulsion and the over-driven engine conditioned for braking action under the control of said relief valve, the heat of compression generated in the steam during braking being given up to said fluid.

15. In a power plant for use in propulsion and for braking including a steam engine having a piston and a cylinder, a steam generator; a heating section and a superheating section in said generator; means forming a jacket for said cylinder; said jacket being in series fluid communication with said sections and intermediate said sections, and the water in said jacket being adapted for heat-exchange with the steam in the cylinder; a throttle valve for regulating flow of steam to the engine during propulsion; a pedal-controlled relief valve; valve-gear associated with the cylinder for controlling the admission of steam thereto and the exhaust of steam therefrom, and adapted to be actuated for forward or reverse propulsion; a braking-control valve; a duct connecting said cylinder with said braking-control valve; a second duct connecting said braking-control valve with said relief valve; and means operatively connecting said valve gear with said braking-control valve; whereby upon actuation of said braking-control valve said valve-gear is conditioned for reverse propulsion, and the over-driven engine conditioned for braking action under the control of said relief valve; the heat of compression generated in the steam during braking being given up to the water in the jacket.

16. In a power plant for use in propulsion and for braking including a steam engine having a piston and a cylinder; a steam generator; a heating section and a superheating section in said generator; means forming a jacket for said cylinder; said jacket being in series fluid communication with said sections and intermediate said sections, and the water in said jacket being adapted for heat-exchange with the steam in the cylinder; a throttle valve for regulating the flow of steam to the cylinder during propulsion; valve-gear associated with the engine for controlling flow of steam to the cylinder and adapted to be actuated for forward or reverse propulsion; a pedal-controlled relief valve for controlling the compression in said cylinder during braking; a braking-control valve operable to connect said relief valve for regulatory action upon closure of said throttle valve, and a member interconnecting said braking-control valve and said valve-gear.

17. In a power plant for use in propulsion and for braking including a steam engine having a piston and a cylinder; a steam generator; a heating section and a superheating section in said generator; means forming a jacket for said cylinder; said jacket being in series fluid communication with said sections and intermediate said sections, and the water in said jacket being adapted for heat-exchange with the steam in the cylinder; a throttle valve for regulating the flow of steam to said cylinder during propulsion; valve-gear associated with the engine for controlling the flow of steam to the cylinder and adapted to be actuated for forward or reverse propulsion; a pedal-controlled relief valve for controlling the pressure in said cylinder during braking; a braking-control valve to adapt said relief valve for regulatory action upon closure of said throttle valve; a member interconnecting said braking-control valve and said valve-gear to effect operation of said valve-gear to reverse position upon operation of said braking-control valve to braking position; a temperature-responsive device in heat-exchanging relation with the steam in said superheating section; a feed-pump for injecting water into said heating section; a burner for the steam generator; and means under the control of said temperature-responsive device and operatively connected for regulation of the feed-water and burner, said last-mentioned means including a mechanism actuated by said interconnecting member; steam-pressure-actuated means for controlling the feed-pump and burner; said mechanism being effective, upon movement of said interconnecting member to shift said valve-gear to reverse position, to preserve control of the feed-pump and burner independently of the condition of the steam-pressure-actuated means.

18. In a power plant for use in propulsion and for braking including a steam engine having a piston and a cylinder, a steam generator, a heating section and a superheating section in said generator, means forming a jacket for said cylinder, said jacket being in series fluid communication with said sections and intermediate said sections and the water in said jacket being adapted for heat-exchange with the steam in the cylinder, a throttle valve for regulating the flow of steam to said cylinder during propulsion, valve-gear associated with the engine for controlling the flow of steam to the cylinder and adapted to be actuated for forward or reverse propulsion, a pedal-controlled relief valve for controlling the pressure in said cylinder during braking, a device for transferring regulation from said throttle valve to said relief valve, a member interconnecting said device and said valve-gear, a temperature-responsive device in heat-exchanging relation with the steam in said superheating section, a feed-pump for injecting water into said heating section, a burner for the steam generator, a source of electric current, a first electrical switch under the control of said temperature-responsive device electrically connecting said source with said pump for controlling flow of fluid therefrom, a second electrical switch under the control of said temperature-responsive device electrically connecting said source with said burner for controlling said burner, a third electrical switch controlled by steam pressure of the generator and controlling the electrical connections to said pump and burner, a fourth electrical switch under the control of said member and electrically connected with said three mentioned switches whereby operation of said pump and burner are under the joint control of said first and second switches respectively and said third switch jointly and upon actuation of said transferring device said fourth switch preserves the control of said pump and burner by said temperature-responsive device irrespective of the condition of said third switch.

ABNER DOBLE.